United States Patent [19]

Pierce et al.

[11] 4,129,026

[45] Dec. 12, 1978

[54] METHOD OF MAKING A PULLEY GROOVE

[75] Inventors: William C. Pierce; Samuel M. Berry, both of Dallas; Arthur D. Johnson, Carrollton, all of Tex.

[73] Assignee: Pitts Industries, Inc., Dallas, Tex.

[21] Appl. No.: 843,662

[22] Filed: Oct. 19, 1977

Related U.S. Application Data

[60] Division of Ser. No. 732,431, Oct. 14, 1976, Pat. No. 4,067,572, which is a continuation-in-part of Ser. No. 630,886, Nov. 11, 1975, Pat. No. 4,004,335.

[51] Int. Cl.² ............................................. B21D 53/26
[52] U.S. Cl. .................................. 72/367; 113/116 D
[58] Field of Search ........................... 29/159 R, 159.1; 72/367; 113/116 D

[56] References Cited

U.S. PATENT DOCUMENTS

| 2,291,393 | 7/1942 | LeJeune | 29/159.1 |
| 3,838,485 | 10/1974 | Oldford | 29/159 R |

FOREIGN PATENT DOCUMENTS 704910  3/1954  United Kingdom ..................... 29/159.1

*Primary Examiner*—Lowell A. Larson

*Attorney, Agent, or Firm*—Clarence A. O'Brien; Harvey B. Jacobson

[57] ABSTRACT

A clutch pulley assembly primarily designed for use with electromagnetic clutches for driving air conditioning compressors on automobiles and the like wherein the component parts of the clutch pulley assembly are fabricated from stampings with a reduction in the amount of machinery required to complete the device. The method of making and assembling the structure is part of the invention and includes the press forming of a web disc for supporting pulley grooves from sheet steel having desirable magnetic properties to produce an annular flange portion thereon at the outer edge thereof and extending substantially perpendicular thereto, then punching a central hub receiving aperture in the disc and then mounting the central aperture of said disc on a central hub made from a tube section. A die forming method of manufacturing a pulley groove is also disclosed. A section of steel tubing is cut to length, this section is press formed by axially moving dies, and then the pulley groove is completed by both axially and radially moving forming dies of multi-segment type. The pulley groove thus formed is then pressed upon the machined outer flange surface of the web disc in which magnetic flux blocking slots have also been punched.

1 Claim, 12 Drawing Figures

METHOD OF MAKING A PULLEY GROOVE

CROSS REFERENCE TO RELATED APPLICATION

This is a division, of application Ser. No. 732,431 filed Oct. 14, 1976, now U.S. Pat. No. 4,067,572 which is a continuation-in-part of U.S. application Ser. No. 630,886, filed Nov. 11, 1975, for Clutch Pulley Assembly and Method of Making Same, now U.S. Pat. No. 4,004,335.

BACKGROUND OF THE INVENTION

This invention generlly to an improved method of fabricating electric clutch pulley assemblies to reduce the cost of materials and labor. Electric clutches with pulleys thereon are normally used for driving air conditioner compressors in vehicles, such as automobiles, trucks, boats, airplanes, etc.

DESCRIPTION OF THE PRIOR ART

In the past in constructing electromagnetic clutch pulleys for automotive air conditioner compressors and the like, such structures have been made from steel forgings requiring an extensive amount of machining in order to meet the critical dimensions as required for a useful product. The forgings themselves are relatively expensive, and the cost of machining same even more so.

The known prior art pulley structures which are fabricated from stampings, etc., are not normally designed to the critical size and dimensional limitations as are required by pulley structures to be used with electromagnetic clutches. These clutches in automotive air conditioner compressor applications and the like rotate at extremely high speeds and require very close adherences to size tolerances.

Known prior art devices which may be pertinent to this invention are listed as follows: U.S. Pat. Nos. 2,074,199 Mar. 16, 1937, 2,095,025 Oct. 5, 1937, 2,646,689 July 28, 1953, 2,787,914 Apr. 9, 1957, 2,846,893 Aug. 12, 1958, 2,906,134 Sept. 29, 1959, 2,995,044 Aug. 8, 1961, 3,094,881 June 25, 1963, 3,722,309 Mar. 27, 1973.

None of these known prior art devices offers the new and unique features of the invention disclosed herein.

SUMMARY OF THE INVENTION

An object of the present invention is to provide a new method of fabricating an electric clutch pulley assembly to reduce cost of materials and labor.

Another object of the present invention is to provide an improved method of making a clutch pulley assembly which eliminates the high cost of steel forgings and provides a basic assembly for use with various sizes of die made pulley grooves, thus reducing manufacturing inventory and yet providing a large range of sizes available from stock.

Another object of this invention is to eliminate high priced forging components for an electric clutch pulley assembly and to use fabricated components from sheet steel and tubing for all the parts of said assembly.

A further object of this invention is to provide an electric clutch pulley assembly fabricated from sheet steel and tubing which has the same magnetic properties as a solid pulley machined from a solid casting or forging.

A still further object of this invention is to fabricate a clutch pulley assembly having less weight than similar pulleys made from castings or forgings which is important in automobile and airplane applications where weight is a problem.

A still further object of this invention is an improved method of making and assembling the clutch pulley assembly to achieve the objects aforesaid.

These and other objects are achieved according to the present invention by fabricating the components of the electric clutch pulley assembly from sheet steel and tubing, rather than making the components from a steel forging or casting, which necessarily requires extensive machining in order to reach the desired dimensional characteristics as required for this critical type application with an electric clutch.

Electric clutches for automotive and other vehicle air conditioner compressor use operate at very high rotational speeds so require that their size dimensions be quite exact. Also, the dynamic balancing of such assemblies is important because of the high rotational speeds and because unbalance of any of the components will cause heavy vibration which is or can be dangerous, or at the very least quite annoying. Reference is herein made to prior U.S. Pat. No. 3,842,378 issued Oct. 15, 1974 to William L. Pierce and assigned to Pitts Industries, Inc., wherein an electric clutch pulley assembly is fully disclosed and explained. As disclosed in this patent, the present type of pulley is made from a low carbon steel forging which is machined all over leaving little more than half its original weight. In this type of manufacture, even though highly automatic turning equipment is used, the large amount of machining is expensive and wasteful. Even the cost of tool inserts is significant. The new way to manufacture this electric clutch pulley assembly is as disclosed in this invention, and as disclosed in our prior co-pending application Ser. No. 630,886, of which the invention disclosed herein is an improvement. As disclosed this invention eliminates the high priced forging altogether by fabricating the assembly from tubing and sheet steel. It has been discovered that a substantial weight reduction is achieved, a reduction in cost and time is achieved, and the resulting structure has the same desirable magnetic properties of the solid pulley formerly used. This is important for proper performance as an electric clutch in the application set forth above.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 2:
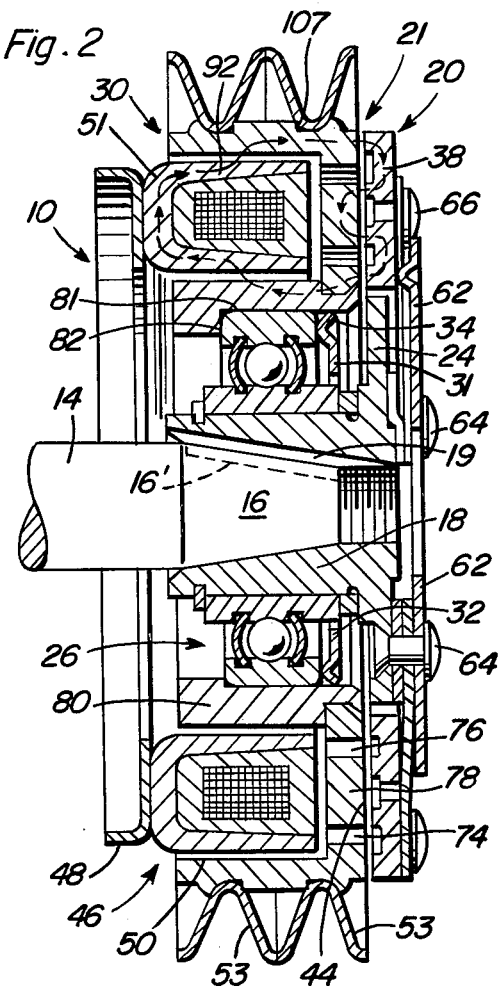
FIG. 2 is a cross sectional view taken generally along line 2—2 of FIG. 1.

Referring now to the drawings in detail, the clutch pulley assembly as made by the method of the present invention is generally referred to in FIG. 2 by the reference numeral 10. This clutch pulley assembly is adapted to transmit power from a power source, such as a vehicle engine, to a vehicle accessory load, such as an air conditioner compressor, not shown. The power shaft 14 of the compressor accordingly extends into the clutch assembly and is provided with a tapered end portion 16 which is held assembled to the hub by means of a bolt, not shown, threaded into the shaft, 14. A key (not shown) is also provided in suitable keyways 16' and 19 to lock hub 18 to shaft 14. Mounted on the hub 18 is a bearing assembly 26 for rotationally supporting the drive pulley assembly 30 which is the structure of this invention. The pulley assembly 30 is adapted to be drivingly connected to the vehicle engine by a pulley belt, not shown, and the pulley assembly 30 forms part of the clutch mechanism 10 together with an armature assembly 20.

The pulley assembly 30 is rotatably mounted on the hub 18 by the bearing assembly 26 in fixed axially spaced relationship to the armature assembly 20 in order to form an axial air gap 21 therebetween. The armature assembly includes a radially outer portion 38 that is displaceable axially into engagement with a friction end face 44 on the pulley assembly 30 by means of an electromagnetic coil assembly 46 which is fixedly mounted by the frame 48 bolted to the housing of a compressor. The coil assembly 46 projects into an annular cavity 50 formed in the pulley assembly 30 and is of a conventional construction. The electromagnetic coil assembly is energized in a manner well known by those skilled in the art whenever the vehicle engine is in operation and when so energized generates a magnetic field 92 that extends from its casing 51 made of material having a low magnetic reluctance property. The pulley assembly 30 is also made of material having low magnetic reluctance in order to permit the establishment of magnetic fields therein. Also, the axially displaceable portion 38 of the armature assembly is made of a material having a low magnetic reluctance.

The displaceable portion 38 of the armature 20 is coupled to the mounting flange portion 24 by means of a plurality of leaf springs 62 pivotally connected at opposite ends by connector 64 to the radial outer portion of the mounting flange 24 on one axial side and by means of pivot connectors 66 to the radially inner portion of the movable disc portion 38 on the same axial side. The leaf spring elements 62 will therefore yieldably resist axial movement of the movable disc portion 38 into engagement with the pulley assembly 30 until such time as electromagnets 46 are energized. For more details of this structure, reference is made to prior U.S. Pat. No. 3,842,378. Like reference numerals are used herein to correspond with those in said patent.

The pulley assembly 30 has a flanged web portion 78 which has circumferential slots 74 and 76 therein to magnetically separate radially inner and outer portions of this web portion of the pulley assembly.

When the electromagnetic assembly is energized the magnetic field produced thereby, which is characterized by the flux path 92 as shown in FIG. 2, extends through the material of the components of the pulley assembly 30 and through the armature disc portion 38. Note, that as shown in FIG. 2, the disc portion 38 is shown separated (gap 21) from the friction surface 44 of the web flange portion 78 which is the position when the flux is not present, i.e., electromagnets are not energized. Obviously, once the electromagnets are energized and flux path 92 occurs, the armature disc 38 will be in firm frictional contact with member 78 and friction surfaces 44 and gap 21 will not be present.

The new and improved method of making the clutch pulley assembly will now be described. The flange web portion 78 (FIG. 4) of the overall pulley assembly 30 is formed from a disc of sheet steel of desirable magnetic properties by means of a press and die arrangement.

Figure 4:
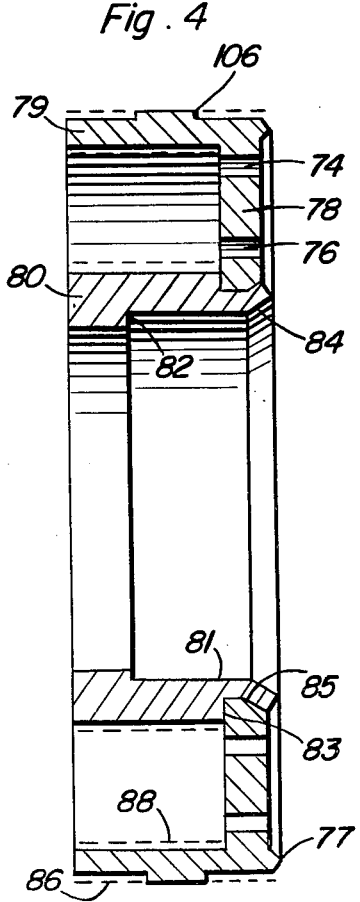
FIG. 4 is a cross sectional view taken generally along line 4—4 of FIG. 3.
Figure 5:
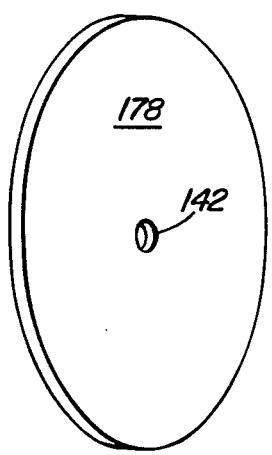
FIG. 5 is a perspective view of the web disc prior to forming and as cut from a blank of sheet steel having desirable magnetic properties.
Figure 6:
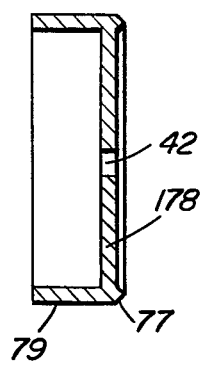
FIG. 6 is a cross section through the center of the web disc of FIG. 5 after the flange portion is formed on the outer circumference thereof.
Figure 7:
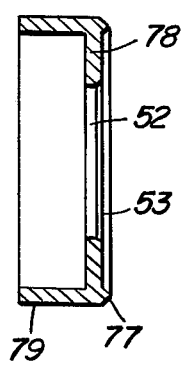
FIG. 7 is a cross section of the web disc after the punching step for forming the large center aperture with flared edge.
Figure 8:
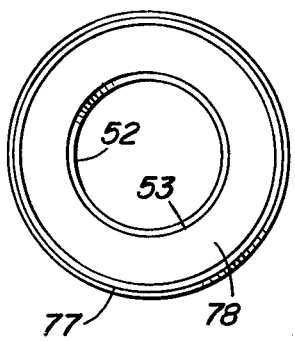
FIG. 8 is a plan view of the web disc after forming by the method of this invention.

FIGS. 5 through 8 illustrate the steps of the method of forming the flange web disc portion 78. As shown in FIG. 5, a basic disc of appropriate size 178 is cut from a sheet of steel having the necessary magnetic properties. A small central aperture 142 is normally also punched or drilled in the disc for centering and alignment purposes. The disc 178 is then press formed by appropriate die and press structure to provide a flange portion 79. The present press and die arrangement is such that a sharp corner 77 is generally left when the flange portion 79 is formed from the basic disc member 178. This sharp corner 77 is later machined off so that a greater friction face 44 will be exposed for contact with clutch armature 38. After the flange portion 79 has been formed from the disc 178 a large central aperture 52 is punched therein. This large aperture 52 normally is provided with a slight edge taper 53. The completed flange web disc (now labelled 78) is shown in FIG. 8 prior to assembly into the overall clutch hub assembly as shown in FIG. 4.

Looking at FIG. 4, the center hub 80 is made from long tubing which is sliced or cut into appropriate short sections and then the inner surface of each section is machined to produce the recessed portion 81 and the abutment 82. Another recessed portion 85 with another abutment 83 is provided on the same end as the recess 81 but on the outside of the tube hub 80. The web flange disc 78, 79, which has been formed as described above with reference to FIGS. 5 through 8, is then mounted on the tube hub 80 and die staked to the hub by die swaging all around the reduced edge thereof as shown at 84. The flared edge 53 around the aperture 52 aids in the forming of a proper joint. This has proven to be a very strong and magnetically efficient joint. After the step of die swaging, the slots 74 and 76, that define the pole areas of the magnetic clutch, are punched out of the member 78. This punching step does cause a slight distortion of the flange portion 79 and therefore a machining step of the outside diameter and inside diameter of the flange is required. This is indicated by the dotted line portions marked 86 and 88 on FIG. 4. This machining, of course, does not require the heavy machinery previously required for making the entire pulley structure from forging. Also, the sharp corner projection 77, if present from the forming operation, may be removed by machining at this same time.

Figure 3:
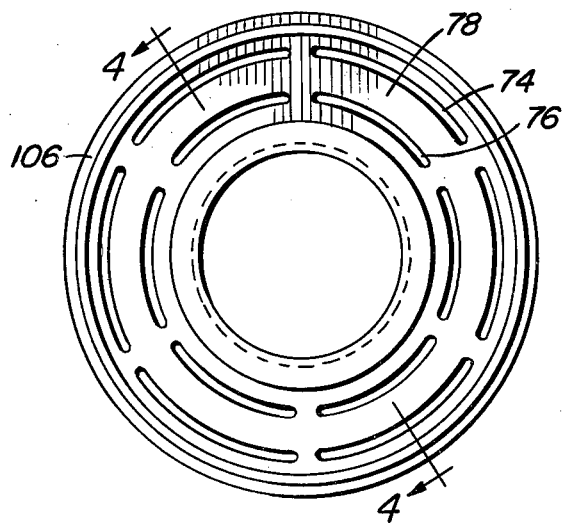
FIG. 3 is a plan view, reduced in size, of the hub, flange and web disc as assembled according to this invention.
Figure 12:
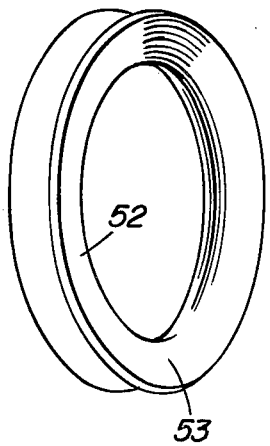
FIG. 12 is a perspective view of the completed pulley groove as formed by the method of this invention.

Once the outer surface of the flange member 79 has been machined to a very close tolerance, then pulley grooves, such as indicated by reference numeral 53 in FIGS. 2 and 12, are assembled thereon. Normally, the clutches have pulley grooves of six inch or seven inch diameter for application to various models of automobiles. One groove is normally actually used, but two are generally provided to minimize stocking of several models. A groove having a 60° belt receiving portion is much used with foreign cars, while American automobiles generally use belt receiving portions in the range of 36°. The hub and flange assembly of FIGS. 3 and 4, as made by the method disclosed herein, is useable with all of the pulley grooves of various sizes and dimensions. Thus, a standard hub assembly manufactured according to the method of this invention is useable with various different pulley grooves in order to reduce stock inventory and offer flexibility of total assembly.

The pulley groove 53 shown can be made by several methods of fabricating sheet material, such as spinning, splitting, or rolling, which methods are more fully described in our co-pending application Ser. No. 630,886. A preferred method of forming the pulley groove 53 will now be described in detail with reference to FIGS. 9 through 11.

Figure 9:
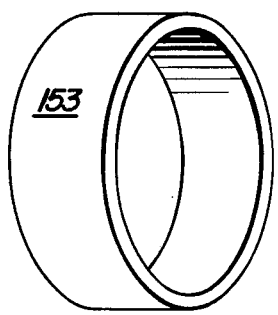
FIG. 9 is a perspective view of a section of steel tubing as provided in the first step of the method of this invention for making a pulley groove.
Figure 10:
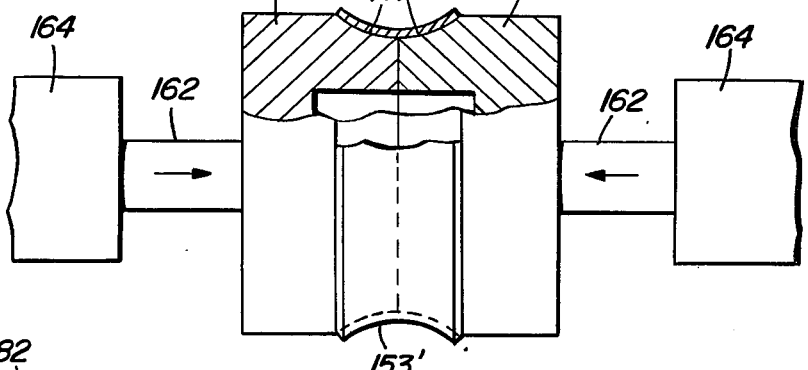
FIG. 10 is a side elevational view, partly in cross section, showing the next step in the method of forming a pulley groove by this invention.

A short section of cylindrical steel material is cut from a length of welded or extruded steel tubing. This section 153 in FIG. 9 is of substantially the correct internal diameter for use with the web disc flange 79 of the basic clutch hub assembly. After the cutting of the short section of tubing 153, the section is formed with a concave surface around the periphery thereof by a second step of the method as indicated in FIG. 10. Round die members 160 are designed and constructed with curved projecting portions 161 and mounted upon any conventional type axially movable press structure such as indicated in general by reference numerals 162 and 164. As can be visualized, when the tube section 153 is placed between the dies 160 which are then pressed together, the tube section is shaped with the convex surface 153' as indicated in FIG. 10.

Figure 11:
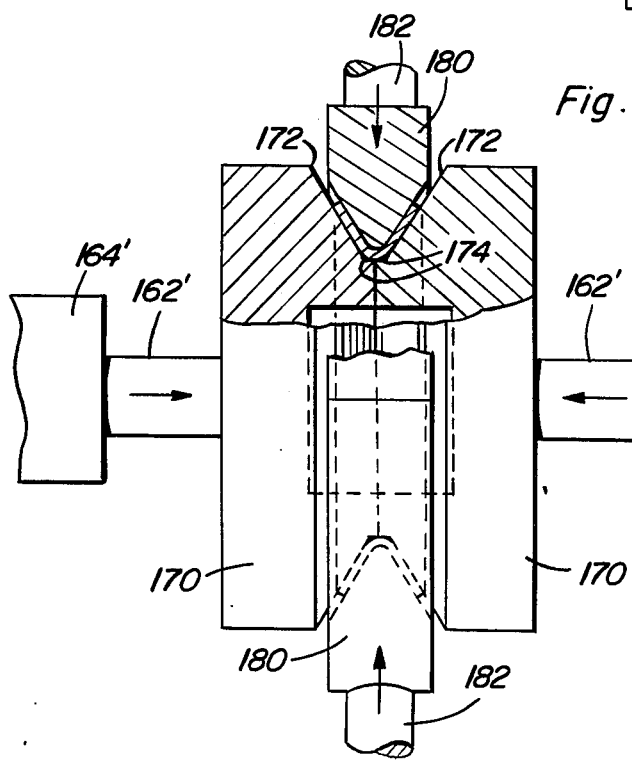
FIG. 11 is another elevational view, partly in cross section, showing the final step in the method of forming a pulley groove by this invention.

The third and final step of forming the pulley groove is accomplished by both an axial and radial forming operation as shown in FIG. 11. Dies 170 have an annular configuration to match that of the desired angle for the pulley groove, as indicated by surfaces 172, and with small axially projecting portions 174 adjacent the points of abutment of the respective die members. The projections 174 on the mating surfaces of the dies 170 are designed so as to provide the desired width for the inner aperture 52 of the pulley flange 53. The dies 170 are mounted upon similar press structure 162' and 164' as for the step of FIG. 10. In addition to the annular dies 170, additional radial die structure 180 is provided to simultaneously press inwardly against the axially formed pulley groove 153'. These die members 180 are also mounted upon movable press members 182 similarly to those 162 and 162' already described. The members 180 may each be semi-circular in shape, or less, as necessary for a proper pressing operation. Upon completion of the third step as shown in FIG. 11, the final pulley groove 53 is produced. If necessary, a slight machining of the aperture 52 may be provided, though normally in actual practice the accuracy of the die forming and pressing operations are sufficient for the pulley groove to be accurately sized, including shoulder number 107 and ready to be press fitted upon the machined outer surface of flange 79, against locating shoulder 106 without any additional machining of the pulley groove being necessary. Once the pulley groove 53 is pressed upon the flange 79 by press fitting as described above, it may be further staked or welded if desired to securely retain same as mounted.

Figure 1:
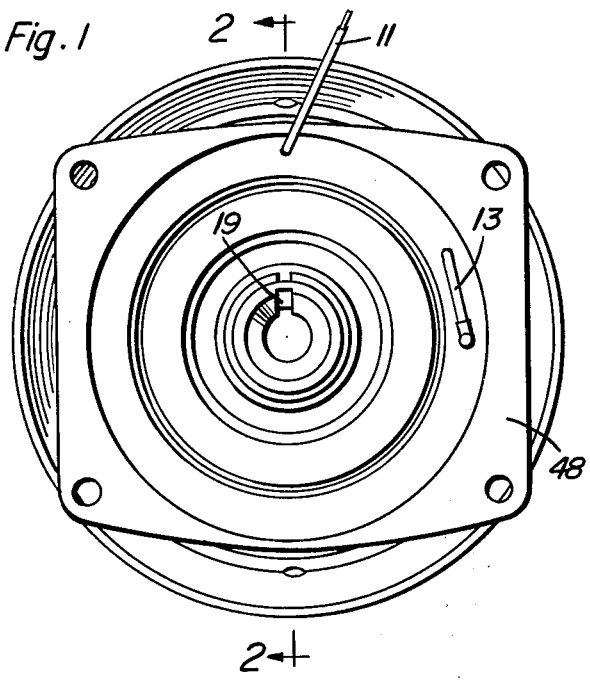
FIG. 1 is an end view of an electric clutch pulley assembly in reduced size according to the present invention.

As disclosed in our parent application, a combination grease retainer and bearing retainer 31 is also provided. This retainer 31 is normally assembled when the bearing is pressed into the recessed inner portion 81 of the hub 80. This retainer comprises an annular member having a large hole therein 32 and a recessed dipped flange portion 34 with the outer edge thereof making an angle of approximately 30° from the vertical. As shown in FIG. 2, this retainer locks the bearing 26 in the hub 80 within the recessed portion 81 by means of a press fit and spring force action of lip 34. It holds the bearing 26 against the shoulder 82 formed by the recess portion 81 and also acts to retain any grease that may purge from the seal from migrating to the friction surface 44. This is an improvement over former designs wherein a separate grease retainer cup is inserted, then the bearing, and finally the bearing retainer at the other end. FIG. 1 shows the electrical connecting wires 11 and 13 for the electromagnet structure of the overall clutch assembly and the support plate 48 for attachment of the assembly to a compressor housing. The keyway 19 in the hub 18 is also clearly shown.

The disclosed structure and method of making an assembly thereof from sheet steel and steel tubing having good magnetic properties produce a clutch pulley assembly for electromagnetic type clutch devices which is new and unique to the field.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The method of manufacturing a pulley groove comprising the steps of:
   (a) cutting a short section of tubing from a long piece of tubing;
   (b) forming the short section of tubing into a peripherally running, smoothly curved, radially inwardly extending concave shape by axially movable dies;
   (c) press forming the tubing by both axial and radial forming operations into a peripherally running shape having a central, inner apical wall defining an inner periphery for mounting on a hub and a pair of radially diverging, substantially flat walls defining a radially outwardly opening pulley groove.

* * * * *